United States Patent
Krah et al.

(10) Patent No.: US 7,598,711 B2
(45) Date of Patent: Oct. 6, 2009

(54) POWER SOURCE SWITCHOVER APPARATUS AND METHOD

(75) Inventors: Christoph H. Krah, Los Altos, CA (US); Ronil Patel, San Jose, CA (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 11/286,523

(22) Filed: Nov. 23, 2005

(65) Prior Publication Data

US 2007/0114968 A1 May 24, 2007

(51) Int. Cl.
H02J 7/04 (2006.01)
H02J 7/00 (2006.01)

(52) U.S. Cl. .................. 320/140; 320/138

(58) Field of Classification Search ............ 320/103, 320/104, 137, 138, 140, 163, 166; 307/10.1, 307/19, 25
See application file for complete search history.

(56) References Cited

U.S. PATENT DOCUMENTS

| | | | |
|---|---|---|---|
| 3,626,408 A * | 12/1971 | Carbrey | 341/163 |
| 4,101,787 A * | 7/1978 | Vail | 307/81 |
| 4,115,865 A | 9/1978 | Beauvais et al. | |
| 4,449,193 A | 5/1984 | Tournois | |
| 4,484,346 A | 11/1984 | Sternberg et al. | |
| 4,532,606 A | 7/1985 | Phelps | |
| 4,559,618 A | 12/1985 | Houseman et al. | |
| 4,564,952 A | 1/1986 | Karabinis et al. | |
| 4,581,760 A | 4/1986 | Schiller et al. | |
| 4,594,673 A | 6/1986 | Holly | |
| 4,622,653 A | 11/1986 | McElroy | |
| 4,669,054 A | 5/1987 | Schlunt et al. | |
| 4,670,858 A | 6/1987 | Almy | |
| 4,694,404 A | 9/1987 | Meagher | |
| 4,695,973 A | 9/1987 | Yu | |
| 4,758,982 A | 7/1988 | Price | |
| 4,783,829 A | 11/1988 | Miyakawa et al. | |
| 4,794,559 A | 12/1988 | Greenberger | |
| 4,825,391 A | 4/1989 | Merz | |
| 4,841,467 A | 6/1989 | Ho et al. | |
| 4,847,789 A | 7/1989 | Kelly et al. | |
| 4,888,583 A | 12/1989 | Ligocki et al. | |
| 4,888,712 A | 12/1989 | Barkans et al. | |

(Continued)

FOREIGN PATENT DOCUMENTS

EP 0166577 1/1986

(Continued)

OTHER PUBLICATIONS

Akeley, K., "RealityEngine Graphics", Computer Graphics Proceedings, Annual Conference Series, pp. 109-116, Aug. 1-6, 1993.

(Continued)

Primary Examiner—Edward Tso
Assistant Examiner—M'Baye Diao
(74) Attorney, Agent, or Firm—Dorsey & Whitney LLP

(57) ABSTRACT

An apparatus for switching from a first power supply to a second power supply. The embodiment may detect the charge or voltage of both the first and second power supply, and power a device from the power supply having the greatest voltage or charge. A single boost converter is used regardless of which power supply is providing power.

25 Claims, 1 Drawing Sheet

U.S. PATENT DOCUMENTS

| | | | |
|---|---|---|---|
| 4,890,242 A | 12/1989 | Sinha et al. | |
| 4,945,500 A | 7/1990 | Deering | |
| 4,961,581 A | 10/1990 | Barnes et al. | |
| 4,970,636 A | 11/1990 | Snodgrass et al. | |
| 4,996,666 A | 2/1991 | Duluk, Jr. | |
| 4,998,286 A | 3/1991 | Tsujiuchi et al. | |
| 5,031,038 A | 7/1991 | Guillemot et al. | |
| 5,040,223 A | 8/1991 | Kamiya et al. | |
| 5,050,220 A | 9/1991 | Marsh et al. | |
| 5,054,090 A | 10/1991 | Knight et al. | |
| 5,067,162 A | 11/1991 | Driscoll, Jr. et al. | |
| 5,083,287 A | 1/1992 | Obata et al. | |
| 5,123,084 A | 6/1992 | Prevost et al. | |
| 5,123,085 A | 6/1992 | Wells et al. | |
| 5,128,888 A | 7/1992 | Tamura et al. | |
| 5,129,051 A | 7/1992 | Cain | |
| 5,129,060 A | 7/1992 | Pfeiffer et al. | |
| 5,133,052 A | 7/1992 | Bier et al. | |
| 5,146,592 A | 9/1992 | Pheiffer et al. | |
| 5,189,712 A | 2/1993 | Kajiwara et al. | |
| 5,245,700 A | 9/1993 | Fossum | |
| 5,247,586 A | 9/1993 | Gobert et al. | |
| 5,265,222 A | 11/1993 | Nishya et al. | |
| 5,278,948 A | 1/1994 | Luken, Jr. | |
| 5,289,567 A | 2/1994 | Roth | |
| 5,293,467 A | 3/1994 | Buchner et al. | |
| 5,295,235 A | 3/1994 | Newman | |
| 5,299,139 A | 3/1994 | Baisuck et al. | |
| 5,315,537 A | 5/1994 | Blacker | |
| 5,319,743 A | 6/1994 | Dutta et al. | |
| 5,338,200 A | 8/1994 | Olive | |
| 5,347,619 A | 9/1994 | Erb | |
| 5,363,475 A | 11/1994 | Baker et al. | |
| 5,369,734 A | 11/1994 | Suzuki et al. | |
| 5,394,516 A | 2/1995 | Winser | |
| 5,402,532 A | 3/1995 | Epstein et al. | |
| 5,448,690 A | 9/1995 | Shiraishi et al. | |
| 5,455,900 A | 10/1995 | Shiraishi et al. | |
| 5,477,132 A | 12/1995 | Canter et al. | |
| 5,481,669 A | 1/1996 | Poulton et al. | |
| 5,493,644 A | 2/1996 | Thayer et al. | |
| 5,509,110 A | 4/1996 | Latham | |
| 5,535,288 A | 7/1996 | Chen et al. | |
| 5,544,306 A | 8/1996 | Deering et al. | |
| 5,546,194 A | 8/1996 | Ross | |
| 5,572,634 A | 11/1996 | Duluk, Jr. | |
| 5,574,835 A | 11/1996 | Duluk, Jr. et al. | |
| 5,574,836 A | 11/1996 | Broemmelsiek | |
| 5,579,455 A | 11/1996 | Greene et al. | |
| 5,596,686 A | 1/1997 | Duluk, Jr. | |
| 5,613,050 A | 3/1997 | Hochmuth et al. | |
| 5,621,866 A | 4/1997 | Murata et al. | |
| 5,623,628 A | 4/1997 | Brayton et al. | |
| 5,664,071 A | 9/1997 | Nagashima | |
| 5,669,010 A | 9/1997 | Duluk, Jr. | |
| 5,684,686 A * | 11/1997 | Reddy | 363/97 |
| 5,684,939 A | 11/1997 | Foran et al. | |
| 5,699,497 A | 12/1997 | Erdahl et al. | |
| 5,710,504 A * | 1/1998 | Pascual et al. | 180/65.8 |
| 5,710,876 A | 1/1998 | Peercy et al. | |
| 5,734,806 A | 3/1998 | Narayanaswami | |
| 5,751,291 A | 5/1998 | Olsen et al. | |
| 5,767,589 A | 6/1998 | Lake et al. | |
| 5,767,859 A | 6/1998 | Rossin et al. | |
| 5,778,245 A | 7/1998 | Papworth et al. | |
| 5,798,770 A | 8/1998 | Baldwin | |
| 5,828,378 A | 10/1998 | Shiraishi | |
| 5,841,447 A | 11/1998 | Drews | |
| 5,850,225 A | 12/1998 | Cosman | |
| 5,852,451 A | 12/1998 | Cox et al. | |
| 5,852,557 A | 12/1998 | Woodward | |
| 5,854,631 A | 12/1998 | Akeley et al. | |
| 5,860,158 A | 1/1999 | Pai et al. | |
| 5,864,342 A | 1/1999 | Kajiya et al. | |
| 5,870,095 A | 2/1999 | Albaugh et al. | |
| RE36,145 E | 3/1999 | DeAguiar et al. | |
| 5,880,736 A | 3/1999 | Peercy et al. | |
| 5,889,997 A | 3/1999 | Strunk | |
| 5,912,552 A | 6/1999 | Tateishi | |
| 5,920,326 A | 7/1999 | Rentshcler et al. | |
| 5,936,629 A | 8/1999 | Brown et al. | |
| 5,949,424 A | 9/1999 | Cabral et al. | |
| 5,949,428 A | 9/1999 | Toelle et al. | |
| 5,977,977 A | 11/1999 | Kajiya et al. | |
| 5,977,987 A | 11/1999 | Duluk, Jr. | |
| 5,990,904 A | 11/1999 | Griffin | |
| 6,002,410 A | 12/1999 | Battle | |
| 6,002,412 A | 12/1999 | Schinnerer | |
| 6,008,629 A * | 12/1999 | Saeki et al. | 320/140 |
| 6,046,746 A | 4/2000 | Deering | |
| 6,057,666 A * | 5/2000 | Dougherty et al. | 320/104 |
| 6,064,187 A | 5/2000 | Redl et al. | |
| 6,084,591 A | 7/2000 | Aleksic | |
| 6,111,582 A | 8/2000 | Jenkins | |
| 6,118,452 A | 9/2000 | Gannett | |
| 6,128,000 A | 10/2000 | Jouppi et al. | |
| 6,144,194 A | 11/2000 | Varga | |
| 6,167,143 A | 12/2000 | Badique | |
| 6,167,486 A | 12/2000 | Lee et al. | |
| 6,201,540 B1 | 3/2001 | Gallup et al. | |
| 6,204,859 B1 | 3/2001 | Jouppi et al. | |
| 6,216,004 B1 | 4/2001 | Tiedemann et al. | |
| 6,228,730 B1 | 5/2001 | Chen et al. | |
| 6,229,293 B1 | 5/2001 | Farrenkopf | |
| 6,229,553 B1 | 5/2001 | Duluk, Jr. et al. | |
| 6,243,488 B1 | 6/2001 | Penna | |
| 6,243,744 B1 | 6/2001 | Snaman, Jr. et al. | |
| 6,246,415 B1 | 6/2001 | Grossman et al. | |
| 6,259,452 B1 | 7/2001 | Coorg et al. | |
| 6,259,460 B1 | 7/2001 | Gossett et al. | |
| 6,263,493 B1 | 7/2001 | Ehrman | |
| 6,268,875 B1 | 7/2001 | Duluk, Jr. et al. | |
| 6,275,235 B1 | 8/2001 | Morgan, III | |
| 6,285,378 B1 | 9/2001 | Duluk, Jr. | |
| 6,288,730 B1 | 9/2001 | Duluk, Jr. et al. | |
| 6,326,774 B1 | 12/2001 | Mueller et al. | |
| 6,331,365 B1 * | 12/2001 | King | 429/9 |
| 6,331,856 B1 | 12/2001 | Van Hook et al. | |
| 6,366,070 B1 | 4/2002 | Cooke et al. | |
| 6,476,807 B1 | 11/2002 | Duluk, Jr. et al. | |
| 6,525,737 B1 | 2/2003 | Duluk, Jr. et al. | |
| RE38,078 E | 4/2003 | Duluk, Jr. | |
| 6,552,723 B1 | 4/2003 | Duluk, Jr. et al. | |
| 6,577,305 B1 | 6/2003 | Duluk, Jr. et al. | |
| 6,577,317 B1 | 6/2003 | Duluk, Jr. et al. | |
| 6,597,363 B1 | 7/2003 | Duluk, Jr. et al. | |
| 6,614,444 B1 | 9/2003 | Duluk, Jr. et al. | |
| 6,650,327 B1 | 11/2003 | Airey et al. | |
| 6,661,116 B1 * | 12/2003 | Seto | 307/10.1 |
| 6,671,747 B1 | 12/2003 | Benkual et al. | |
| 6,677,734 B2 | 1/2004 | Rothleitner et al. | |
| 6,683,441 B2 | 1/2004 | Schiff et al. | |
| 6,693,639 B2 | 2/2004 | Duluk, Jr. et al. | |
| 6,697,063 B1 | 2/2004 | Zhu | |
| 6,717,576 B1 | 4/2004 | Duluk, Jr. et al. | |
| 6,771,264 B1 | 8/2004 | Duluk et al. | |
| 6,809,504 B2 | 10/2004 | Tang et al. | |
| 7,242,169 B2 | 7/2007 | Kanamori et al. | |
| 7,266,001 B1 * | 9/2007 | Notohamiprodjo et al. | 363/59 |
| 7,388,349 B2 * | 6/2008 | Elder et al. | 320/104 |
| 2003/0209997 A1 * | 11/2003 | St-Germain et al. | 315/291 |
| 2004/0130552 A1 | 7/2004 | Duluk, Jr. et al. | |
| 2004/0232879 A1 * | 11/2004 | Wang et al. | 320/103 |
| 2004/0233144 A1 * | 11/2004 | Rader et al. | 345/82 |

| | | | | |
|---|---|---|---|---|
| 2005/0258941 | A1* | 11/2005 | Berard | 340/333 |
| 2005/0266300 | A1* | 12/2005 | Lamoreux et al. | 429/50 |
| 2006/0044846 | A1* | 3/2006 | Hjort et al. | 363/34 |

FOREIGN PATENT DOCUMENTS

| | | |
|---|---|---|
| EP | 0870282 | 5/2003 |
| WO | WO 90/04849 | 5/1990 |
| WO | WO 95/27263 | 10/1995 |

OTHER PUBLICATIONS

Angel, E., "Interactive Computer Graphics: A Top-Down Approach with OpenGl", ISBN: 0201855712, Addison-Wesley, pp. 241, 242, 277 and 278, 1997.

Carpenter, L., "The A-buffer, An Antialaised Hidden Surface Method", Computer Graphics, vol. 18, No. 3, pp. 103-108, Jul. 1984.

Clark, J., "Hierarchical Geometric Models for Visible Surface Algorithms", Communications of the ACM, vol. 19, No. 10, pp. 547-554, Oct. 1976.

Clark et al., "Distributed Proc in High Performance Smart Image Memory", LAMDA 4th Quarter, pp. 40-45, Oct. 1990.

Cook et al., "The Reyes Image Rendering Architecture," Computer Graphics, vol. 21, No. 4, pp. 95-102, Jul. 1987.

Das et al., "A systolic algorithm for hidden surface removal", Parallel Computing, vol. 15, pp. 277-289, 1990.

Deering et al., "Leo: A System for Cost Effective 3D Shaded Graphics", Computer Graphics Proceedings, Annual Conference Series, pp. 101-108, Aug. 1-6, 1993.

Demetrescu, S., "High Speed Image Rasterization Using a Highly Parallel Smart Bulk Memory", Stanford Tech Report, pp. 83-244, Jun. 1983.

Demetrescu, S., "High Speed Image Rasterization Using Scan Line Access Memories", Chapel Hill Conference on VLSI, pp. 221-243, 1985.

Duluk et al., "VLSI Processors for Signal Detection in SETI", Presented at XXXVIIth International Astronautical Congress, Innsbruck, Austria, Oct. 4-11, 1986.

Foley et al., "Computer Graphics: Principles and Practice", Addison-Wesley Professional, Second Edition, 1990.

Franklin, W., "A Linear Time Exact Hidden Surface Algorithm", Computer Graphics, pp. 117-123, Jul. 1980.

Franklin et al., "Parallel Object-Space Hidden Surface Removal", Computer Graphics, vol. 24, No. 4, pp. 87-94, Aug. 1990.

Fuchs et al., "Pixel-Planes 5: A Heterogeneous Multiprocessor Graphics System Using Processor-Enhanced Memories", Computer Graphics, vol. 23, No. 3, pp. 79-88, Jul. 1989.

Gharachorloo et al., "A Characterization of Ten Rasterization Techniques", Computer Graphics, vol. 23, No. 3, pp. 355-368, Jul. 1989.

Gharachorloo et al., "Super Buffer: A Systolic VLSI Graphics Engine for Real Time Raster Image Generation", Chapel Hill Conference on VLSI, Computer Science Press, pp. 285-305, 1985.

Gharachorloo et al., "Subnanosecond Pixel Rendering with Million Transistor Chips", Computer Graphics, vol. 22, No. 4, pp. 41-49, Aug. 1988.

Gharachorloo et al., "A Million Transistor Systolic Array Graphics Engine", Proceedings of the International Conference on Systolic Arrays, San Diego, CA, pp. 193-202, May 25-27, 1988.

Goris et al., "A Configurable Pixel Cache for Fast Image Generation", IEEE Computer Graphics & Applications, Mar. 1987.

Greene et al., "Hierarchial Z-Buffer Visibility", Computer Graphics Proceedings, Annual Conference Series, pp. 231-238, Aug. 1-6, 1993.

Gupta et al., "A VLSI Architecture for Updating Raster-Scan Displays", Computer Graphics, vol. 15, No. 3, pp. 71-78, Aug. 1981.

Gupta, S., "PS: Polygon Streams, A Distributed Architecture for Incremental Computation Applied to Graphics", Advances in Computer Graphics Hardware IV, ISBN 0387534733, Springer-Verlag, pp. 91-111, May 1, 1991.

Hall, E., "Computer Image Processing and Recognition", Academic Press, pp. 468-484, 1979.

Hu et al., "Parallel Processing Approaches to Hidden-Surface Removal in Image Space", Computer and Graphics, vol. 9, No. 3, pp. 303-317, 1985.

Hubbard, P., "Interactive Collision Detection", Brown University, ACM SIGGRAPH 94, Course 2, Jul. 24-29, 1994.

Jackel, D. "The Graphics PARCUM System: A 3D Memory Based Computer Architecture for Processing and Display of Solid Models", Computer Graphics Forum, vol. 4, pp. 21-32, 1985.

Kaplan et al., "Parallel Processing Techniques for Hidden Surface Removal" SIGGRAPH 1979 Conference Proceedings, p. 300.

Lathrop, "The Way Computer Graphics Work", Chapter 7: Rendering (converting a scene to pixels), Wiley Computer Publishing, John Wiley & Sons, Inc., pp. 93-150, 1997.

Linscott et al., "Artifical Signal Detectors," International Astronomical Union Colloquium No. 99, Lake Balaton, Hungary, Stanford Universtiy, Jun. 15, 1987.

Linscott et al., "Artificial Signal Detectors," Bioastronomy—The Next Steps, pp. 319-355, 1988.

Linscott et al., "The MCSA II—A Broadband, High Resolution, 60 Mchannel Spectrometer," Nov. 1990.

Naylor, B., "Binary Space Partitioning Trees, A Tutorial", (included in the course notes Computational Representations of Geometry), Course 23, ACM SIGGRAPH 94, Jul. 24-29, 1994.

Nishizawa et al., "A Hidden Surface Processor for 3-Dimension Graphics", IEEE, ISSCC, pp. 166-167 and 351, 1988.

Ohhashi et al., "A 32b 3-D Graphics Processor Chip with 10M Pixels/s Gouraud Shading", IEEE, ISSCC, pp. 168-169 and 351, 1988.

Oldfield et al., "Content Addressable Memories for Storing and Processing Recursively Subdivided Images and Trees", Electronics Letters, vol. 23, No. 6, pp. 262-263, Mar. 1987.

Parke, F., "Simulation and Expected Performance of Multiple Processor Z-Buffer Systems", SIGGRAPH '80 Conference Proceedings, pp. 48-56, 1980.

Peercy, et al., "Efficient Bump Mapping Hardware", Computer Graphics Proceedings, Annual Conference Series, pp. 303-306, Aug. 3-8, 1997.

Pineda, J., "A Parallel Algorithm for Polygon Rasterization", SIGGRAPH 1988 Conference Proceedings, Aug. 1988.

Potmesil et al., "The Pixel Machine: A Highly Parallel Image Computer", Computer Graphics, vol. 23, No. 3, pp. 69-78, Jul. 1989.

Poulton et al. "Pixel-Planes: Building a VLSI-Based Graphic System", Chapel Hill Conference on VLSI, Computer Science Press, Inc., pp. 35-60, 1985.

Rao et al., "Discrete Cosine Transform: Algorithms, Advantages, Applications," Academic Press, Inc., pp. 242-247, 1990.

Rossignac et al., "Depth-Buffering Display Techniques for Constructive Solid Geometry", IEEE, Computer Graphics & Applications, pp. 29-39, Sep. 1986.

Samet et al., "Data Structures 59: Hierarchical Data Structures and Algorithms for Computer Graphics", IEEE, Computer Graphics & Applications, pp. 59-75, Jul. 1988.

Schilling et al., "Texram: a Smart Memory for Texturing", IEEE, Computer Graphics and Applications, pp. 32-41, May 1996.

Schneider, B., "Towards A Taxonomy for Display Processors", Advances in Computer Graphics Hardware IV, ISBN 0387534733, Springer-Verlag, pp. 91-111, May 1, 1991.

Schneider et al., "Advances In Computer Graphics Hardware III", Chapter 9, Proof: An Architecture for Rendering in Object Space, ISBN 0387534881, Springer-Verlag, pp. 67-83, Jun. 1, 1991.

Segal, "Hardware sorting chip steps up software pace", Electronic Design, vol. 34, No. 15, pp. 85-91, Jun. 26, 1986.

Shepard et al., "Real-time Hidden Surface Removal in a Flight Simulator", Proceedings of the Pacific Rim Conference on Communications, Compute and Signal Processing, Victoria, CA, pp. 607-610, May 9-10, 1991.

Soderberg et al., "Image Generation Design for Ground-Based Network Training Environments", International Training Equipment Conference, London, May 4-6, 1993.

Sutherland et al., "A Characterization of ten Hidden-Surface Algorithms" Computing Surveys, vol. 6, No. 1, pp. 1-55, Mar. 1974.

Torborg, G., "A Parallel Processor Architecture for Graphics Arithmetic Operations", Computer Graphics, vol. 21, No. 4,, pp. 197-204, Jul. 1987.

Warnock, "A Hidden Surface Algorithm for Computer Generated Halftone Pictures", Univerity of Utah Doctoral Thesis, 1969.

Watt, 3D Computer Graphics, "Chapter 4: Reflection and Illumination Models", 2nd Edition, Addison-Wesley, pp. 89-126, 1993.

Weiler et al., "Hidden Surface Removal Using Polygon Area Sorting", vol. 11, No. 2, pp. 214-222, Jul. 1977.

Whelan, D., "A Rectangular Area Filling Display System Architecture", Computer Graphics, vol. 16, No. 3, pp. 147-153, Jul. 1982.

* cited by examiner

POWER SOURCE SWITCHOVER APPARATUS AND METHOD

BACKGROUND OF THE INVENTION

I. Technical Field

The present invention relates generally to electrically-powered devices, and more particularly to a circuit for switching between multiple power sources.

II. Background Art

Many modern devices are electrically powered. Oftentimes, such power is supplied by one or more portable power sources, such as a battery. As used herein, the term "battery" refers generally to any cell that may store energy and furnish the stored energy as an electrical current. For example, batteries may be electrostatic or electrochemical in nature.

Certain devices may use multiple batteries connected in parallel. Often this is done in order to extend the operation of the device; by providing multiple batteries, the device may draw power from one battery individually or both batteries simultaneously. Presuming the device's operation requires a fixed power, the overall operating life of the device may be extended by using multiple batteries.

As electronic devices have become more and more popular, compact, and advanced, they have come to rely heavily on batteries for power. It is not always practicable or useful to power electronic devices from a fixed or corded power supply. For example, wireless computer peripherals such as keyboards and mice that communicate with a computer by infrared or radio frequency, such as Bluetooth, have no hardwired connection through which power may be supplied. Accordingly, these devices generally employ batteries to operate.

Many other electronic devices, such as remote controls, calculators, cameras, watches, toys, games, and so forth likewise employ multiple batteries for operation.

An ongoing trend (particularly with respect to consumer electronics) is the concept of miniaturization. Electronic devices have become smaller and smaller; many modern electronic devices may perform the same functions as a device multiple times their size could only a few years ago. However, as electronics continue to shrink in size, space for circuitry and electronic components within devices becomes an issue. A premium is thus often placed on fitting the same functionality for a given circuit or component within a small footprint.

Given these constraints in battery-powered devices, certain issues may emerge. For example, although many electronic devices employ some form of battery-switching device to ensure power is drawn from the one battery having the highest voltage in an array of batteries, such switching devices typically require one boost converter for each battery (or at least multiple boost converters). Where space and/or cost is at a premium, it may be undesirable to use multiple boost converters in a single switching circuit.

Likewise, the use of multiple boost converters in a single battery-switching circuit requires power and voltage to drive each of the boost converters. This adds to the overall power consumption of the circuit, which in turn depletes the batteries faster and shortens the operational life between battery changes of the associated electronic device.

Accordingly, there is a need in the art for an improved battery-switching circuit.

SUMMARY OF THE INVENTION

Generally, one embodiment of the present invention takes the form of an apparatus for switching from a first power supply to a second power supply. The embodiment may detect the charge or voltage of both the first and second power supply, and power a device from the power supply having the greatest voltage or charge.

The embodiment may function even where one or both power supplies have a relatively low voltage. For example, the embodiment may function even when one or both power supplies have a voltage of 0.9 volts. Further, the embodiment's performance does not require a dedicated bias supply under such circumstances. Generally speaking, the embodiment is limited in operation only by the input voltage requirements of an associated boost converter. Further, the present embodiment typically employs a single boost converter despite offering the capability of switching between multiple batteries.

The embodiment may, for example, be used to switch between two batteries. Each battery may be placed in an electronic device, such as a computer mouse, other computer peripheral, or any battery-powered object. The batteries may be of any size, and may be the same size or type of battery or may be different in size and/or type. For example, both batteries may be AA batteries.

Continuing the example, when the batteries are inserted into the computer mouse, the embodiment determines which battery has a higher initial voltage and draws power for the mouse from that battery. (Alternatively, if only a single battery is inserted, the embodiment may draw power from the single battery.) As power is drawn from this "active battery," the active battery's voltage decreases.

At some point, the active battery's voltage will drop below the voltage of the passive battery (i.e., the battery not presently providing power for the computer mouse). When this occurs, the present embodiment may detect that the passive battery's voltage exceeds that of the active battery, and begin drawing power from the passive battery while ceasing to draw power from the active battery. In effect, at this time the passive battery becomes the active battery and vice versa.

In this manner, the present embodiment may alternate between two or more power sources to provide power for a device, drawing the power from the source having the highest charge or voltage.

It should be noted that embodiments of the present invention may be used with a variety of power sources and in a variety of apparatuses. The present invention may be used with practically any apparatus powered by a battery, for example. Accordingly, embodiments of the present invention may be employed in computer equipment and/or peripherals, electronics devices (including remote controls), flashlights, battery-operated handheld devices, and so on.

Another embodiment of the present invention takes the form of a battery-switching apparatus for switching between at least a first battery and a second battery, including a first battery compartment having a first positive terminal and a first negative terminal, a second battery compartment having a second positive terminal and a second negative terminal, and a single boost converter electrically connected to each of the first and second battery compartments, wherein the boost converter is operative to draw power from a one of the first and second battery compartments having the highest voltage. The embodiment may also include a comparator electrically connected to each of the first and second battery compartments, wherein the comparator is operative to switch a power supply for the single boost converter to a one of the first and second battery compartments having the highest voltage.

Still another embodiment of the present invention may take the form of a method for switching between at least a first battery and a second battery, including the operations of detecting a first voltage across the first battery, detecting a second voltage across the second battery, determining which of the first voltage and second voltage is greatest, and, in response to determining which of the first voltage and second voltage is greatest, supplying power from the greatest voltage to a single boost converter.

These and other advantages and features of the present invention will become apparent to those of ordinary skill in the art upon reading this disclosure in its entirety.

DETAILED DESCRIPTION

I. Introduction

Figure 1:
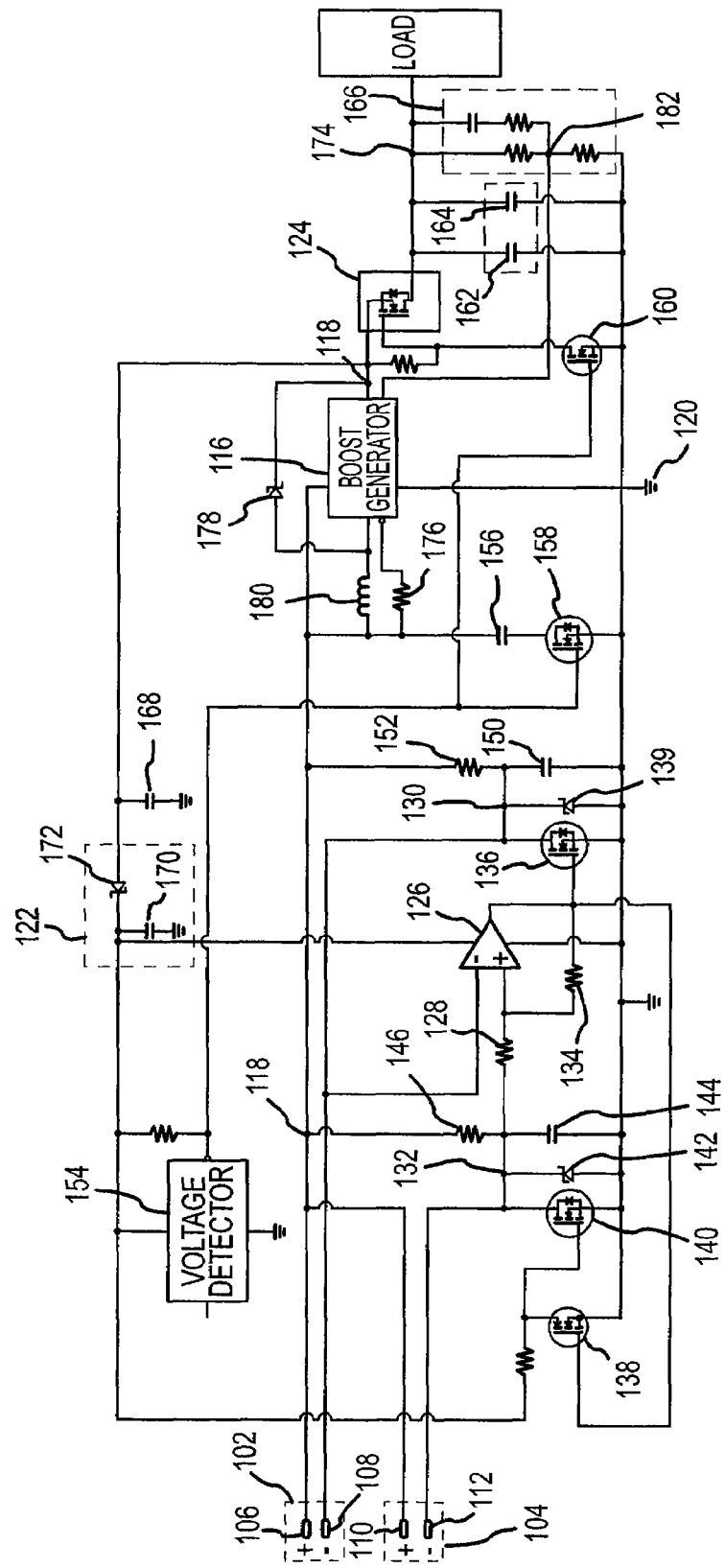
FIG. 1 depicts an exemplary embodiment of the present invention.

Generally, one embodiment of the present invention takes the form of an apparatus for switching from a first power supply to a second power supply. The embodiment may detect the charge or voltage of both the first and second power supply, and power a device from the power supply having the greatest voltage or charge.

The embodiment may function even where one or both power supplies have a relatively low voltage. For example, the embodiment may function even when one or both power supplies have a voltage of 0.9 volts. Further, the embodiment's performance does not require a dedicated bias supply under such circumstances. Generally speaking, the embodiment is limited in operation only by the input voltage requirements of an associated boost converter. Further, the present embodiment typically employs a single boost converter despite offering the capability of switching between multiple batteries.

The embodiment may, for example, be used to switch between two batteries. Each battery may be placed in an electronic device, such as a computer mouse, other computer peripheral, or any battery-powered object. The batteries may be of any size, and may be the same size or type of battery or may be different in size and/or type. For example, both batteries may be M batteries.

Continuing the example, when the batteries are inserted into the computer mouse, the embodiment determines which battery has a higher initial voltage and draws power for the mouse from that battery. (Alternatively, if only a single battery is inserted, the embodiment may draw power from the single battery.) As power is drawn from this "active battery," the active battery's voltage decreases.

At some point, the active battery's voltage will drop below the voltage of the passive battery (i.e., the battery not presently providing power for the computer mouse). When this occurs, the present embodiment may detect that the passive battery's voltage exceeds that of the active battery, and begin drawing power from the passive battery while ceasing to draw power from the active battery. In effect, at this time the passive battery becomes the active battery and vice versa. Both batteries are connected to a single boost converter, which boosts the output of the active battery to an output voltage level. As the batteries are swapped in and out of the "active battery" role, the batteries are electrically connected to, and provide power to, this single boost converter.

In this manner, the present embodiment may alternate between two or more power sources to provide power for a device, drawing the power from the source having the highest charge or voltage.

It should be noted that embodiments of the present invention may be used with a variety of power sources and in a variety of apparatuses. The present invention may be used with practically any apparatus powered by a battery, for example. Accordingly, embodiments of the present invention may be employed in computer equipment and/or peripherals, electronics devices (including remote controls), flashlights, battery-operated handheld devices, and so on.

II. Physical Configuration

FIG. 1 depicts a schematic of an exemplary embodiment 100 of the present invention. A first battery 102 and second battery 104 may be connected to the embodiment 100. The first battery and second battery, for example, may be placed in respective first and second battery compartments. The positive terminals 106, 110 of each battery 102, 104 are connected to a first common node 118. Further, through first common node 118, the positive terminals 106, 110 are connected to a voltage input of a boost converter 116. The configuration and operation of the boost converter 116 are well known to those of ordinary skill in the art. The boost converter 116 is also connected to a ground 120 and, through its output, to a peak detector 122 and output transistor 124. Essentially, the boost converter 116 is a switching DC/DC converter producing an output voltage greater than the source voltage. Thus, the boost converter 116 acts to amplify the voltage of the battery 102, 104 from which power is presently being drawn.

A comparator 126 is operationally connected to the negative terminals of both batteries 102,104. The negative terminal 108 of the first battery 102 is connected to the comparator's inverting input. The negative terminal 112 of the second battery 104 is connected to the noninverting input of the comparator 126. A resistor 128 may be placed between the second battery's negative terminal 112 and the noninverting input, and is part of a hysteresis circuit. In brief, the hysteresis circuit accounts for recovery of the batteries 102, 104 when a load is removed. Essentially, the hysteresis circuit reduces the likelihood that the comparator 126 oscillates between batteries 102,104 as the battery voltages change due to removal of the voltage load. Such oscillation, if permitted, may reduce the efficiency of the embodiment 100.

The comparator 126 is also operationally connected to a number of additional electrical elements. For example, the comparator 126 is connected to the peak detector 122, which supplies a positive supply voltage, as well as to the ground 120, which provides a negative supply voltage of zero volts.

The comparator's output is operationally connected to a second resistor 134, which, in combination with the first resistor 128, forms the aforementioned hysteresis circuit.

The output of the comparator 126 is also connected to the ground 120 and to the gate of a first field-effect transistor 136. Likewise, the comparator output is connected to the gate of a second field-effect transistor 138. Generally speaking, the transistors depicted in FIG. 1 and discussed herein are n-channel metal oxide semiconductor field-effect transistors, or n-channel "MOSFETs." It should be noted that alternative embodiments may use p-channel MOSFETs, depletion mode MOSFETs, and so on. Typically, although not necessarily, embodiments of the present invention do not employ bipolar junction transistors ("BJT"), insofar as the power required to drive a BJT is relatively high and BJTs can be inefficient with respect to power consumption. Furthermore, BJTs typically have a saturation voltage across their collector-emitter junction when turned on. This saturation voltage causes a reduction in overall efficiency.

The first field-effect transistor 136 has three terminals, namely a gate, a drain, and a source terminal. As previously mentioned, the gate terminal of the transistor 136 is connected to the output of the comparator 126. The source terminal of the transistor 136 is connected to the ground 120, and the drain terminal of the transistor 136 is connected to a second common node 130. Through the second common node 130, the drain terminal is also connected to the negative terminal 108 of the first battery 102 and the inverting input of the comparator 126.

In addition to the first transistor 136, a first diode 139 and first capacitor 150 are also operationally connected to the second common node 130. The first diode 139 and first capacitor 150 are both connected between the second common node 130 and the ground 120. Effectively, the first diode and first capacitor are likewise connected from the drain terminal to the source terminal of the first transistor 136.

A second transistor 138 has its gate terminal connected to the output of the comparator 126. The second transistor's source terminal is connected to the ground 120 and its drain terminal is connected to the gate of a third transistor 140.

The source terminal of the third transistor 140 is connected to the ground 120, while the drain terminal of the third transistor is connected to a third common node 132. This third common node 132 is likewise connected to the negative terminal 112 of the second battery and the first resistor 128. Thus, the source-to-drain path of the third transistor 140 stretches between the ground 120 and the third common node 132.

Likewise, a second diode 142 and second capacitor 144 both are connected between the third common node 132 and ground 120.

A first pullup resistor 152 may be connected between the second common node 130 and the first common node 118.

A second pullup resistor 146 may be placed between the third common node 132 and first common node 118. Accordingly, the second pullup resistor 146 is likewise electrically connected between the third common node 132 and the positive terminal 106 of the first battery 102.

The first and second pullup resistors 152, 146 typically have relatively high resistance values, such that they may approximate an open circuit. In one exemplary embodiment, the first and second pullup resistors are one mega-ohm resistors. Generally, the pullup resistors may establish defined voltages at the second and third common nodes 130, 132 in case a first battery or second battery is not inserted. More specifically, the pullup resistor 146 may maintain a voltage equal or above ground at the third common node 132 when a first battery is inserted and a second battery is not inserted. Similarly, the pullup resistor 152 may maintain a voltage equal to or above ground at the second common node 130 when a first battery is not inserted and a second battery is inserted.

Operationally and electrically connected to the output of the peak detector 122 is a voltage detector 154. The voltage detector 154 acts as a comparator having a fixed threshold. Once this threshold is met, the detector outputs an invariant voltage.

Connected between the first common node 118 and the ground 120 are a third capacitor 156 and fourth transistor 158 in series. That is, the capacitor is connected between the first common node 118 and the drain terminal of the fourth transistor 158. The source terminal of the transistor, in turn, is connected to the ground 120. The gate terminal of the fourth transistor is connected to the output of the voltage detector 154.

A diode 178 may serve as a switching element and be wired across the boost converter, between a switch input and the voltage output of the converter. The diode 178 may transfer energy stored in an inductor 180 to one or more output capacitors 162. Typically, the inductor 180 is electrically connected to the first node and the switch input of the boost converter 116.

Generally, a boost converter 116 includes either an internal switching element (such as a p-channel field effect transistor) or an external pass element (such as a Shottkey diode). Either such converter may be used in the present embodiment 100, although the embodiment is shown with a boost converter 116 having an external pass element. In an embodiment employing a boost converter with an internal switch element, the diode 178 may not be present.

As previously mentioned, the output of the boost converter 116 is electrically connected to an output transistor 124. Specifically the boost converter's output is connected to the source terminal of the output transistor. It should be noted that the output transistor is typically a p-channel transistor in the present embodiment, rather than an n-channel transistor. Alternative embodiments may use an n-channel transistor for the output transistor.

The gate terminal of the output transistor 124 is electrically connected to the drain terminal of a fifth transistor 160. This fifth transistor's source terminal is connected to the ground 120. The operation of the fifth transistor 124, including its interaction with the output transistor 124, is discussed in more detail below.

The output capacitor 162 is electrically connected between the output of the output transistor 124 and the ground 120 The output capacitor 162 is disconnected from the output of the boost converter 116 until the output voltage equals Vbias.

Additionally, a voltage divider 166 may be used to set the output voltage level of the boost converter 116. The voltage divider 166 is generally connected between the ground 120 and the output of the boost converter 116, as shown in FIG. 1, with a center tap 182 connected to the boost converter's feedback pin. It should be noted that the feedback voltage divider 166 is optional. Boost converters having a fixed output voltage may be used in embodiments of the present invention. Such boost converters generally do not require an external feedback divider network 166. The voltage divider 166 shown is exemplary; alternative voltage dividers as known to those of ordinary skill in the art (for example, incorporating one or more capacitors and/or additional resistive elements) may be used.

Having described the general configuration of an exemplary embodiment 100 of the present invention, the operation of the embodiment will now be disclosed. The embodiment 100 may operate in a number of modes, namely an initial mode, a comparator mode, and a switching mode. Further, the switching mode may vary depending on which battery 102, 104 is inserted into the embodiment 100, or if both batteries are present. Each of the operational modes will be discussed in turn.

III. Initial Operation

When one or both batteries 102, 104 are inserted into the embodiment 100, the embodiment begins operation in an "initial operation mode." In this mode, the embodiment 100 establishes an initial bias voltage for the switchover transistors (i.e., the first and third transistors 136, 140).

Initially, one battery may be inserted, or both batteries may be inserted. As a first example, presume only the first battery 102 is inserted.

In such a case, the voltage across the first capacitor 150 is initially zero. Because the second battery 104 is not present, the second capacitor 144 may be charged through the second pullup resistor 146. (This occurs because the voltage at the common node 118 equals the voltage of the first battery 102, while the end of the first capacitor 150 opposite the second pullup resistor 146 is zero, insofar as it is connected to the ground 120.)

When the battery 102 is initially inserted, the voltage at the second common node 130 is zero. This occurs because the first capacitor 150 initially has zero charge. Similarly, the voltage at the third common node 132 is zero, because the second capacitor 144 initially has zero charge. Because the current flows from the ground 120 into the negative battery terminal 108 of the first battery 102 through the second common node 130, the first capacitor 150 is slowly charged. This, in turn, causes the voltage across the first capacitor 150 to build up in direction of the current flow. Accordingly, the voltage at the second common node 130 drops below the ground 120. The diode 139 may function as a safety mechanism to prevent the voltage across the first capacitor 150 from dropping below a certain level. When the voltage at the second common node 130 drops below this certain level, the first diode 139 starts conducting and clamps the voltage across the first capacitor 150 to the characteristic forward voltage of diode 139. During initial operation, this first diode will ideally never conduct.

Furthermore, the initial output of the voltage detector 154 is zero volts. Since this output is attached to the gates of the fourth and fifth transistors 158, 160, these transistors remain open and no current may flow from drain to source across these transistors. Accordingly, the gate to source voltage of the output transistor 124 is also zero and no current may flow to the output capacitor 162 or the voltage divider network 166. Thus, the output capacitor 162 is initially disconnected from the output of the output transistor 124 to prevent the output capacitor 162 from absorbing charge. Similarly, input capacitor 156 is initially disconnected from the input of the boost converter 116 to prevent input capacitor 156 from absorbing charge.

In the present embodiment 100, the peak detector 122 includes a peak capacitor 170 and a peak diode 172 and generally provides a temporary bias voltage (Vbias) for the switchover transistors 136, 140 and comparator 126 during initial startup of the boost converter 116. The peak detector diode 172 may isolate the peak capacitor 170 from the output of the boost converter. In this manner, the peak detector diode prevents charge from being depleted from the peak capacitor 170 when the output transistor 124 is turned on and the embodiment 100 outputs a voltage at the output node 174.

Specifically, the charge of the storage capacitor 168 is initially zero. Once the first battery 102 is inserted, the voltage at the anode of the peak detector diode 172 equals the input voltage. For purposes of this discussion, presume the input voltage is 0.9 volts.

When the first battery 102 is initially inserted, the charge across the first capacitor 150 is initially zero. Because current flows from the ground 120 into the negative terminal 108 of the first battery 102, the voltage across the first capacitor 150 builds up in the same direction. Thus, the voltage at the second common node 130 drops below ground until it reaches its final voltage $V_{c1f}$, which is established by the time the voltage across the peak detector capacitor 170 reaches the threshold voltage of the voltage detector 154. For example the threshold voltage may be 1.8 volts. This final voltage is typically relatively low, so that the voltage at the second common node 130 is likewise relatively low.

As the boost converter 116 switches on, a storage capacitor 168 and peak capacitor 170 charge to an aggregate voltage $V_{pd}$, representing the average voltage across the peak detector capacitor and storage capacitor 168 The voltage $V_{pd}$ may be expressed as the charge of the capacitors 168, 170 122 divided by the capacitance $C_{pd}$. Expressed mathematically, this is: $V_{pd}=Q_{pd}/C_{pd}$. The charge stored in the storage capacitor 168 and peak capacitor 170 ($Q_{pd}$) thus may be expressed as:

$$Q_{pd}=V_{pd} \times C_{pd}$$

During initial startup of the embodiment 100, the increase in aggregate voltage across the peak capacitor 170 and the storage capacitor 168 is a function of the voltage across the first capacitor 150 and the power consumed by the boost converter 116. In order to calculate the voltage $V_{CIN}$ across the first capacitor 150 when the first battery 102 is inserted (or second capacitor 144, when the second battery 110 is inserted) at the end of the initial operation, i.e. when the aggregate voltage across the storage capacitor 168 and peak capacitor 170 has reached the threshold of voltage comparator 154, tone may relate input power and output power of the boost converter 116.

The efficiency of the boost converter 116 may be stated as:

$$\eta_{BOOST} = \frac{P_{OUT}}{P_{IN}} \rightarrow P_{OUT} = \eta_{BOOST} \cdot P_{IN} \quad \text{(Equation 1)}$$

Here, $P_{IN}$ is the input power into the boost converter 116 and $P_{OUT}$ is the output power from the boost converter 116. The efficiency $n_{BOOST}$ generally takes into account the static power consumed by the internal circuitry of the boost converter necessary to boost the input voltage to the desired output voltage level.

The input power $P_{IN}$ may be defined as follows:

$$P_{IN}=V_{IN} \cdot I_{IN} \quad \text{(Equation 2)}$$

In Equation 2, $V_{IN}$ is the input voltage to the boost converter 116 and $I_{IN}$ is the boost converter's input current.

The output power from the boost converter 116 ($P_{OUT}$) may be defined as:

$$P_{OUT}=V_{OUT} \cdot I_{OUT} \quad \text{(Equation 3)}$$

Here, $V_{OUT}$ is the output voltage of the boost converter 116 and $I_{OUT}$ is the output current.

The boost converter 116 receives its power from the series combination of the first or second battery 102, 104 and corresponding first or second capacitor 150, 144, with respect to the ground 120. Since the current into the first or second capacitor 150, 144 flows from the ground 120 into the negative terminals 108, 112 of the first or second batteries 102, 104, the voltage $V_{CIN}$ across the first or second capacitor builds up oppositely to the voltage across the first or second battery. Accordingly, the input voltage of the boost converter 116 may be expressed as:

$$V_{IN}=V_{BAT}-V_{CIN} \quad \text{(Equation 4)}$$

Here, $V_{BAT}$ is the battery voltage of the first or second battery 102, 104 (whichever is providing power to the boost converter 116 as the active battery), and $V_{CIN}$ is the voltage across the corresponding first or second capacitor 150, 144 (i.e., the capacitor corresponding to the active battery).

The input current $I_{IN}$ to the boost converter 116 may be expressed as:

$$I_{IN} = C_{IN} \cdot \frac{dV_{CIN}}{dt} \quad \text{(Equation 5)}$$

The charge $C_{IN}$ represents the charge of either the first or second capacitor 144, 150 (whichever capacitor corresponds to the active battery). Similarly, $dV_{CIN}$ is the differential voltage change across $C_{IN}$ in time interval dt.

Further, $I_{OUT}$ can be expressed as:

$$I_{OUT} = C_{OUT} \cdot \frac{dV_{COUT}}{dt} \quad \text{(Equation 6)}$$

Here, $C_{OUT}$ is the combined capacitance of the storage capacitor 168 and peak capacitor 170.

By substituting equations 4, 5, 6 in equations 1, 2 and 3 and rearranging the resulting equation, the following may be obtained:

$$(V_{BAT} - V_{CIN}) \cdot \eta_{BOOST} \cdot C_{IN} \cdot \frac{dV_{CIN}}{dt} = \quad \text{(Equation 7)}$$

$$V_{COUT} \cdot C_{OUT} \cdot \frac{dV_{COUT}}{dt}$$

This is a differential equation. By eliminating the dt term and integrating the solution is:

$$C_{IN} \cdot \eta_{BOOST} \cdot \int_0^{V_{CIN}} (V_{BAT} - V_{CIN}) \cdot dV_{CIN} = \quad \text{(Equation 8)}$$

$$C_{OUT} \cdot \int_0^{V_{BIAS}} V_{COUT} \cdot dV_{COUT}$$

$$C_{IN} \cdot V_{BAT} \cdot V_{CIN} - \frac{C_{IN} \cdot V_{CIN}^2}{2} = \frac{C_{OUT} \cdot V_{BIAS}^2}{2 \cdot \eta_{BOOST}}.$$

Note that by multiplying both sides of equation 8 by dt, and considering that E=P×dt, the terms in Equation 8 are energies and not powers.

From Equation 8, it may be seen that the energy conservation law is satisfied. The right side of the equation is the energy stored in $C_{OUT}$, which is the sum of the storage capacitor 168 and peak capacitor 170. $V_{BIAS}$ is the average voltage across these capacitors (not taking into account the effects of the peak diode 172). $V_{BAT}$ is the battery voltage (from either the first or second battery 102, 104, depending on which is presently supplying power to the boost converter 116). $C_{IN}$ is the charge of either the capacitor 150 or second capacitor 144 and $V_{CIN}$ is the voltage $C_{IN}$ charges to when $C_{OUT}$ has reached $V_{BIAS}$. The right term of Equation 1 is the energy stored in capacitor $C_{OUT}$ when charged to the bias voltage. The second term on the left side of Equation 1 is the energy stored in $C_{IN}$ after $C_{OUT}$ is charged to the bias voltage.

The first term on the left side of Equation 1 is the energy drawn from the active battery after $C_{OUT}$ is charged to $V_{BIAS}$. The combined energies stored in charges $C_{IN}$ and $C_{OUT}$ are typically supplied by the battery. Realistically, the active battery should provide a higher energy to overcome any inefficiencies of the boost converter 116.

Equation 8 can be rewritten as follows:

$$V_{CIN}^2 - 2 \cdot V_{BAT} \cdot V_{CIN} + V_{BAT}^2 = -\frac{C_{OUT} \cdot V_{BIAS}^2}{C_{IN} \cdot \eta_{BOOST}} + V_{BAT}^2 \quad \text{(Equation 9)}$$

This equation has two solutions, as follows:

$$(V_{CIN} - V_{BAT})^2 = V_{BAT}^2 - \frac{C_{OUT} \cdot V_{BIAS}^2}{C_{IN} \cdot \eta_{BOOST}} \rightarrow \quad \text{(Equation 10)}$$

$$V_{CIN} = V_{BAT} \pm \sqrt{V_{BAT}^2 - \frac{C_{OUT} \cdot V_{BIAS}^2}{C_{IN} \cdot \eta_{BOOST}}}$$

Since $V_{CIN}$ cannot exceed $V_{BAT}$, the solution to Equation 10 is:

$$V_{CIN} = V_{BAT} - \sqrt{V_{BAT}^2 - \frac{C_{OUT} \cdot V_{BIAS}^2}{C_{IN} \cdot \eta_{BOOST}}} \quad \text{(Equation 11)}$$

Given $C_{IN}$=10 uF, $V_{BAT}$=0.9V, $n_{BOOST}$=0.8, $C_{OUT}$=0.02 uF and $V_{OUT}$=1.8V, $V_{CIN}$ would be 4.5 mV. It should be noted other values for any or all of these variables may be used. Additionally, it should be noted that it is possible to reduce $V_{CIN}$ further by increasing the ratio of $C_{OUT}$ and $C_{IN}$ according to Equation 11.

The voltage at the first common node 118 should reach (or maintain) a certain value for the boost converter 116 to be active, and thus for the embodiment 100 to produce a output voltage at the output node 174. That is, the lower the voltage $V_{c1f}$, the lower the minimum voltage of the battery 102 may be to operate the boost converter 116. The boost converter 116 may have a minimum voltage threshold, below which it will not operate. Thus, the voltage of the first common node 118 (i.e., the voltage "seen" by the boost converter at the positive terminal 106 of the first battery 102) must equal or exceed the boost converter's minimum voltage threshold for the embodiment 100 to produce an output voltage at the output node 174.

One way to ensure this occurs is to minimize the voltage across the first capacitor 150, namely $V_{c1f}$. The capacitances of the first capacitor 150 and the two peak capacitors 168, 170 may be selected to minimize the voltage $V_{c1f}$ according to the equations above. In effect, the voltage of the active battery must exceed the minimum startup voltage threshold of the boost converter by at least at least $V_{c1f}$, or the final voltage of the first capacitor 150 so the boost converter 116 is able to start up.

IV. Comparator Operation

The minimum startup voltage of the boost converter 116 in the present embodiment 100 may be expressed as the minimum voltage required to power the regulator (i.e., the minimum voltage requirement for operation of a boost converter of this type and model), plus the voltage $V_{c1f}$. Accordingly, minimizing $V_{c1f}$ also decreases the minimum voltage of the first battery 102 necessary to operate the boost converter.

A. First Battery Operation

Returning to the initial state when the first battery 102 is inserted into the embodiment 100, it has been noted that the voltage at the second common node 130 is zero since the first capacitor 150 has zero charge and thus shorts the first transistor 136 and first diode 139.

After the first battery 102 is inserted, the first capacitor 150 charges from the current flowing from the ground 120 into the negative battery terminal 108. This, in turn, causes the voltage at the second common node 130 to drop below ground. By contrast, the second capacitor 144, which initially holds third common node 132 at the potential of the ground 120 (i.e., zero voltage), charges through the second pullup resistor 146. Accordingly, the voltage of the third common node 132 rises above ground with time.

Thus, because the absolute value of the voltage (i.e., the voltage irrespective of whether it is a positive or negative voltage) at the inverting input, i.e. the voltage at second common node 130, is below the absolute value of the voltage at the noninverting input, i.e. the voltage at third common node 132, the comparator 126 outputs a positive voltage, enabling the first transistor 136 and the second transistor 138. Generally, the first and second transistors turn on when the voltages at their respective gates rise above a certain threshold value. Thus, the output of the comparator 126 should be sufficient to activate the first and second transistors. The second transistor 138, in turn, disables the third transistor 140. Thus, the negative terminal 108 of the first battery 102 is connected to the ground 120 by the first transistor 136, and a current loop through the first battery may be established. In this state, the voltage at the third common node 132 continues to rise as the voltage across the first capacitor 150 is clamped to ground by transistor 136, thus maintaining the comparator's 126 output state. In this manner, the boost converter 116 may draw on the voltage of the first battery 102. This permits the capacitor 168 and the first peak detector capacitor 168 to charge.

Eventually, the storage capacitor 168 and the peak detector capacitor 170 will charge until their aggregate output voltage $V_{PD}$ reaches the threshold of the voltage detector 154. This threshold is called "$V_{bias}$." Once this occurs, the voltage detector 154 outputs a voltage (also equal to $V_{bias}$). The voltage detector's output is connected to the gates of the fourth and fifth transistors 158, 160.

When the voltage $V_{bias}$ is applied to the gates of the fourth and fifth transistors 158, 160, current may flow through these transistors. This permits the boost converter 116 to operate in a so-called "normal mode." In the normal mode, the output transistor 124 is switched on by current flowing from the source terminal to the drain terminal of the fifth transistor 160, and to the gate of the output transistor 124. Thus, the output transistor closes and current may flow from the boost converter 116 to the output node 174. The final voltage $V_{out}$ (established at the output node 174) and the voltage across the output capacitor 162 will rise to the voltage set by the voltage divider 166. Since the output node 174 is connected to the peak detector, the voltage $V_{bias}$ may drop by one forward voltage drop ($V_{fw}$) below $V_{out}$. The forward voltage $V_{fw}$ is the characteristic voltage drop of diode 172.

B. Second Battery Operation

Just as the embodiment 100 and, in particular, the comparator 126 may operate when only the first battery 102 is installed, so may the embodiment operate when only the second battery 104 is installed. The general operation is similar to that described above with respect to the operation when only the first battery 102 is present. For example, the operation of the peak detector 122, voltage detector 154, and boost converter 116 is generally the same as previously described.

However, certain differences are present in the embodiment 100 when the second battery 104 is installed alone, as opposed to when only the first battery 102 is present. When the second battery 104 is inserted into the embodiment 100 the voltage at the second common node 130 is zero since the second capacitor 144 has zero charge and thus shorts the third transistor 140 and second diode 142. After the second battery 104 is inserted, the second capacitor 144 charges from current flowing from the ground 120 into the second battery's negative terminal 112. Charging the second capacitor 144 generally causes the voltage at the third common node 132 to drop below the voltage at the ground. By contrast, the first capacitor 150, which initially holds the second common node 130 at zero volts (i.e., ground voltage), charges via the first pullup resistor 152. As the first capacitor charges, the voltage of the second common node 130 slowly rises above ground.

Thus, because the absolute value of the voltage (i.e., the voltage irrespective of whether it is a positive or negative voltage) at the inverting input, i.e. the voltage at node 132, is below the absolute value of the voltage at the noninverting input, i.e. the voltage at node 130, the comparator 126 outputs a negative voltage with respect to the ground voltage.

Because the comparator 126 has a negative voltage output, neither the first transistor 136 nor the second transistor 138 are active. However, because the second transistor is not active, the third transistor 140 is active. In this manner, the comparator shorts capacitor 144 and enables charging of the second capacitor 150 through pullup resistor 152. The second capacitor 144 may thus charge from the second battery 104 via pullup resistor 146. This is exactly the opposite scenario as that described above in Section II.A. ("First Battery Operation").

Essentially, when the second battery 104 is placed in the embodiment 100 and the first battery 102 is not, the comparator 126 reverses the status of the first, second and third transistors 136, 138, 140 from what was previously described.

Although certain voltages are reversed, the operation of the boost converter 116 is not affected, nor are the operations of the peak detector 122, voltage detector 154, output transistor 124, output capacitor 162 or voltage divider 166. The only difference is that the boost converter may draw charge from the second battery 104 because the comparator 126 acts to complete a current loop with the second battery (and disable any current loop through the first battery 102 terminals) by switching the transistors 136, 138, 140 to account for the presence of the second battery.

C. Operation With Both Batteries

If both batteries 102, 104 are inserted, the embodiment 100 (by means of the comparator 126) will activate the battery having the highest cell voltage. Typically, only one battery 102, 104 is activated at any given time. That is, the boost converter 116 generally draws power from one battery or the other, but not both. Once the battery having the highest cell voltage is determined, the embodiment operates as described above.

More particularly, after initial startup of the boost converter 116 (i.e. after the boost converter is operating in its active mode), the battery 102, 104 that will power the embodiment 100 is the battery with the higher cell voltage.

For example, presume the comparator's output voltage is either high or low (due to the hysteresis circuit associated with the comparator 126, either the third transistor 140 is on and the first transistor 136 is off or vice versa. Effectively, four different scenarios exist for operation of the embodiment 100 when both batteries 102, 104 are inserted. Each is discussed in turn.

The first scenario is when the third transistor 140 is active, the first transistor 136 is off and the voltage of the first battery 102 exceeds the voltage of the second battery 104. In this case, the non-inverting node of the comparator 126 is at ground. Because the batteries 102, 104 are connected at their positive terminals (through the first common node 118) the voltage at the second common node 130, and thus at the inverting node of the comparator, equals the voltage of the second battery 104 less the voltage of the first battery 102 (Vbat2−Vbat1). Since Vbat 1 exceeds Vbat 2, the resulting voltage at the second common node 130 is below ground (i.e., negative). Therefore, since the voltage at the inverting node of the comparator 126 is lower than the voltage at the non-inverting, node the output of the comparator is high and a positive voltage is outputted. This positive output voltage turns on the first transistor 136 and second transistor 138, while turning off the third transistor 140. Therefore, the embodiment 100 (and particularly the boost converter 116) draws power from the first battery 102 and deactivates the second battery 104, since the first battery has the higher cell voltage.

A second scenario is when the third transistor 140 is on, the first transistor 136 is off, and Vbat1<Vbat2. In this second scenario, the non-inverting input of the comparator 126 is at ground. Because the batteries 102, 104 are connected at their positive terminals 106, 110 (through the first common node 118), the voltage at the second common node 130, and thus at the inverting input of the comparator 126, is Vbat2−Vbat1. Because Vbat 1 is less than Vbat 2, the resulting voltage at the second common node 130 is positive. Therefore, since the voltage at the inverting input of the comparator 126 is higher than the voltage at the comparator's non-inverting input, the comparator's output voltage goes to low (typically, is a negative voltage) and keeps the third transistor 140 on and the first transistor 136 off. Accordingly, the embodiment 100 maintains the same operating state as present at the beginning of this scenario.

In a third scenario, the third transistor 140 may be off, the first transistor 136 on, and the voltage of the first battery 102 (Vbat1) may exceed the voltage of the second battery 104 (Vbat2). Accordingly, the inverting input of the comparator 126 (and the second common node 130) is at a ground voltage. Since the first and second batteries' positive terminals 106, 110 are connected through the first common node 118, the voltage of the third common node 132 and the non-inverting input of the comparator 126 is (Vbat1−Vbat2). Because Vbat 1 is greater than Vbat 2, the voltage of the third common node 132 is above ground (i.e., positive). Therefore, since the voltage at the non-inverting input of the comparator 126 is higher than the voltage at the comparator's inverting input the output of the comparator goes to a high state (i.e., a positive voltage) and enables the second transistor 138 and first transistor 136, as well as disabling the third transistor 140. In this manner, the embodiment 100 maintains the state of the transistors 136, 138, 140 described at the beginning of this third scenario, and draws power from the first battery 102.

The fourth scenario occurs when the third transistor 140 is off, the first transistor 136 is on, and the voltage of the first battery 102 is less than the voltage of the second battery 104. In this fourth scenario, the voltage at the second common node 130 and inverting input of the comparator 126 are at ground. Because the batteries 102, 104 are connected at their positive terminals 106, 110 through the first common node 118, the voltage at the third common node 132 equals Vbat1−Vbat2. Thus, the voltage of the non-inverting input of the comparator 126 is likewise Vbat1−Vbat2. Since Vbat 1 is less than Vbat 2, the voltage of the third node 132 is negative. Therefore, since the voltage of the inverting input exceeds the voltage of the non-inverting input, the output of the comparator 126 goes low. This, in turn, effectively turns off the first and second transistors 136, 138 and turns on the third transistor 140. Accordingly, the embodiment 100 switches to the second battery 104 by enabling the third transistor 140. This occurs because the second battery's cell voltage exceeds the first battery's cell voltage.

A specific example may aid in understanding the operation of the embodiment 100 when both batteries 102, 104 are inserted. For example, presume the first transistor 136 is active and the third transistor 140 is off. Further presume Vbat1=1 volt and Vbat2=1.2 volts. In this example, the resulting voltage at the third common node 132 (and thus at the non-inverting input of the comparator 126) would be 1V-1.2V, or −0.2V. However, because the voltage at the second common node 130 (and thus at the inverting input of the comparator) would be at ground, the comparator's output voltage would transition from high to low, effectively enabling the third transistor 140 and disabling the first transistor 136 because the second battery 104 has a cell voltage greater than that of the first battery. Thus, the first battery is switched out of the embodiment 100 and the boost converter 116 may draw power from the second battery.

It may be noted from the foregoing that, as the voltages of the first battery 102 and second battery 104 are very close, small changes in their respective voltages may cause the comparator 126 to switch rapidly between the batteries. If, for example, the first battery's voltage drops just below that of the second battery, the comparator will switch the transistors to bring the second battery into the circuit and drop the first battery out. However, this may only last for a few seconds or even fractions of seconds before the boost converter 116 pulls sufficient charge from the second battery to drop its voltage below that of the first battery. Thus, the embodiment 100 may oscillate rapidly between batteries.

To prevent such oscillations, two resistors 128, 134 form a hysteresis network. The hysteresis network maintains the operation of the comparator 126 for a time even when the currently active battery's voltage drops below the voltage of the inactive battery. The hysteresis network smoothes out battery transitions and ensures the voltage difference between batteries is sufficiently significant to prevent constant swapping. In one embodiment, the hysteresis network only permits swapping between batteries when the active battery's voltage is at least 100 millivolts below the voltage of the inactive battery. Alternative embodiments may vary this value.

D. Operational Summary

The following table summarizes the states of the comparator inputs and certain transistors, depending on which batteries are present.

|  | First Transistor 136 | Second Transistor 138 | Third Transistor 140 | Inverting Input | Noninverting Input | Comparator 126 Output |
|---|---|---|---|---|---|---|
| First Battery 102 only | Active (closed) | Active (closed) | Inactive (open) | Zero Voltage | Positive Voltage | Negative voltage |
| Second Battery 104 only | Inactive (open) | Inactive (open) | Active (closed) | Positive voltage | Zero Voltage | Positive voltage |

It should also be noted that the voltage at the third common node 132 always goes above zero when the first battery 102 is inserted, due to the second capacitor 144 charging. Likewise, when the second battery 104 is inserted, the second common node will always become positive, since the first capacitor 150 may charge.

If both batteries 102, 104 are installed, the embodiment 100 detects the battery having the highest voltage and acts as if that battery were the only one installed, as described above.

V. Circuit Elements

Generally, the present embodiment 100 has been described with respect to generic circuit elements, such as "transistors" and "diodes." Certain embodiments may employ certain types of transistors and/or diodes for a variety of reasons. For example, field-effect transistors and particularly MOSFETs may be used for any or all of the transistors discussed herein. Further, it should be understood that the first, second, third, fourth and fifth transistors 136, 138, 140, 158, 160 disclosed herein are n-channel devices, while the output transistor 124 is a p-channel device. However, it will be apparent to those of ordinary skill in the art that a p-channel device may be used in place of an n-channel device, and vice versa, by appropriately modifying the embodiment 100.

In one embodiment, n-channel field-effect transistors (FETs) are employed in order to take advantage of the relatively low voltage differential between source and gate required to operate the transistor. Many n-channel FETs may operate when the voltage differential between gate and source is 0.9 volts. Accordingly, because the output of the comparator 126 equals the voltage of the peak detector's output, which in turn equals the voltage of the battery providing power for the boost converter 116, the present embodiment may operate when the voltage of such a battery is as low as 0.9 volts.

Additionally, although alternative transistors may be employed in alternative embodiments, certain embodiments typically use FETs in order to provide inherent polarity protection. In this manner, the embodiment 100 will not operate if the polarity of the battery 102, 104 is reversed (i.e., the battery is inserted upside-down).

Likewise, the various diodes mentioned herein are generally Shottkey diodes. However, alternative embodiments may employ a different type of diode as will be appreciated by those of ordinary skill in the art.

VI. Conclusion

Although the present invention has been described with respect to particular apparatuses, configurations, and methods of operation, it will be appreciated by those of ordinary skill in the art upon reading this disclosure that certain changes or modifications to the embodiments and/or their operations, as described herein, may be made without departing from the spirit or scope of the invention. For example, an alternative embodiment of the present invention may be configured to switch between three separate power sources. The third power source may be electrically connected to one input of a second comparator, for example. The second comparator may have as its second input the output of the comparator 126. Accordingly, the proper scope of the invention is defined by the appended claims. The various embodiments, operations, and configurations disclosed herein are generally exemplary rather than limiting in scope.

We claim:

1. A battery-switching apparatus for switching between at least a first battery and a second battery, comprising:
    a first battery compartment operative to house a first battery and having a first positive terminal and a first negative terminal;
    a second battery compartment operative to house a second battery and having a second positive terminal and a second negative terminal;
    a single boost converter connected to each of the first and second battery compartments; wherein
    the boost converter is operative to draw power from one of the first and second battery compartments having the highest voltage;
    a first capacitor, wherein the first capacitor is enabled when a voltage of the first battery exceeds a voltage of the second battery; and
    a second capacitor, wherein the second capacitor is enabled when a voltage of the second battery exceeds a voltage of the first battery;
    the first positive terminal of the first battery compartment is connected directly to a first common node;
    the second positive terminal of the second battery compartment is connected directly to the first common node;
    the first negative terminal of the first battery compartment is connected to a first input of a comparator through a second common node; and
    the second negative terminal of the second battery compartment is connected to a second input of the comparator through a third common node.

2. The battery-switching apparatus of claim 1, wherein:
    the comparator is electrically connected to each of the first and second battery compartments; further wherein
    the comparator is operative to switch to the one of the first and second battery compartments having the highest voltage in order to supply power to the boost converter.

3. The battery-switching apparatus of claim 2, further comprising:
    a first transistor operatively connected to the comparator; and
    a second transistor operatively connected to the comparator; wherein
    the first and second transistors switch states according to an output of the comparator.

4. The battery-switching apparatus of claim 3, wherein:
    the first and second transistors are each electrically connected to the output of the comparator; and
    the first transistor switches off when the second transistor switches on.

5. The battery-switching apparatus of claim 1, wherein:
    a voltage at the second common node exceeds a voltage at the third common node when a cell voltage of a first battery in the first battery compartment exceeds a cell voltage of the second battery in the second battery compartment.

6. The battery-switching apparatus of claim 1, wherein:
    a voltage at the third common node exceeds a voltage at the second common node when a cell voltage of the second battery exceeds a cell voltage of the first battery.

7. The battery-switching apparatus of claim 1, further comprising:
    a first capacitor electrically connected to the second common node at a first side and electrically connected to a ground at a second side; and
    a second capacitor electrically connected to the third common node at a first side and electrically connected to the ground at a second side.

8. The battery-switching apparatus of claim 7, wherein:
    the first capacitor is operative to charge from a cell voltage of the first battery; and
    the second capacitor is operative to charge from a cell voltage of the second battery.

9. The battery-switching apparatus of claim 8, wherein:
    as the first capacitor charges, a voltage of the second common node rises; and as the second capacitor charges, a voltage of the third common node rises.

10. The battery-switching apparatus of claim 9, wherein:
as the cell voltage of the first battery drops, the charge of the first capacitor drops and the voltage of the second common node drops; and
as the cell voltage of the second battery drops, the charge of the second capacitor drops and the voltage of the third common node drops.

11. The battery-switching apparatus of claim 1, further comprising an output transistor operatively connected to an output of the boost converter.

12. The battery-switching apparatus of claim 11, further comprising:
a peak detector operatively connected to the output of the boost converter; and
a voltage detector operatively connected to the output of the peak detector.

13. The battery-switching apparatus of claim 12, wherein:
the output transistor is operative to switch on when the voltage detector outputs a voltage above a voltage threshold;
an output voltage at an output node is zero until the output transistor switches on; and
the output voltage at the output node exceeds zero after the output transistor switches on.

14. The battery-switching apparatus of claim 1, wherein the boost converter is operative to draw power from the one of the first and second battery compartments having the highest voltage until the voltages of both the first and second battery compartments are below 0.9 volts.

15. The battery-switching apparatus of claim 1, wherein the output of the boost converter supplies a bias voltage for operation of at least one transistor operatively connected thereto.

16. A method for switching between at least a first battery and a second battery, comprising:
detecting a first voltage across the first battery;
detecting a second voltage across the second battery;
determining which of the first voltage and second voltage is greatest, further comprising:
enabling a first capacitor and disabling a second capacitor in the event the first voltage exceeds the second voltage, wherein the operation of disabling the second capacitor comprises:
enabling a third capacitor; and
employing an output of the third capacitor to disable the second capacitor;
disabling the first capacitor and enabling the second capacitor in the event the second voltage exceeds the first voltage; and
in response to determining which of the first voltage and second voltage is greatest, supplying power from the greatest voltage to a single boost converter.

17. The method of claim 16, wherein the single boost converter is electrically connected to both the first battery and second battery.

18. The method of claim 17, wherein the operation of supplying power from the greatest voltage to a single boost converter comprises disabling the one of the first and second voltages not supplying power to the single boost converter.

19. The method of claim 18, wherein at least one transistor is used to disable the one of the first and second voltage not supplying power to the single boost converter.

20. The method of claim 19, further comprising:
detecting a bias voltage;
in the event the bias voltage exceeds a threshold, activating an output transistor; and
in response to activating the output transistor, outputting an output voltage.

21. The method of claim 18, further comprising:
charging a peak detector capacitor from an output of the boost converter; and
once the peak detector capacitor is fully charged, detecting the bias voltage.

22. The method of claim 18, wherein the operation of determining which of the first voltage and second voltage is greatest is executed by a comparator.

23. The method of claim 20, further comprising the operation of charging an output capacitor from the output voltage after activating the output transistor.

24. The method of claim 19, further comprising:
detecting when the greatest voltage falls below the one of the first and second voltages that is not the greatest voltage;
in response to detecting when the greatest voltage falls below the one of the first and second voltages that is not the greatest voltage, disabling the one of the first and second voltages corresponding to the greatest voltage; and
further in response to detecting when the greatest voltage falls below the one of the first and second voltages that is not the greatest voltage, enabling the one of the first and second voltages not corresponding to the greatest voltage.

25. The apparatus of claim 1, wherein:
the first capacitor charges from the first battery only when enabled; and
the second capacitor charges from the second battery only when enabled.

* * * * *

UNITED STATES PATENT AND TRADEMARK OFFICE
CERTIFICATE OF CORRECTION

PATENT NO.       : 7,598,711 B2                                         Page 1 of 1
APPLICATION NO. : 11/286523
DATED            : October 6, 2009
INVENTOR(S)      : Krah et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 253 days.

Signed and Sealed this

Twenty-eighth Day of September, 2010

David J. Kappos
*Director of the United States Patent and Trademark Office*